(12) United States Patent
Brenner et al.

(10) Patent No.: US 12,074,416 B2
(45) Date of Patent: Aug. 27, 2024

(54) CONNECTING ARRANGEMENT

(71) Applicant: Purem GmbH, Neunkirchen (DE)

(72) Inventors: Holger Brenner, Stuttgart (DE); Manfred Nicolai, Esslingen (DE)

(73) Assignee: Purem GmbH, Neunkirchen (DE)

( * ) Notice: Subject to any disclaimer, the term of this patent is extended or adjusted under 35 U.S.C. 154(b) by 34 days.

(21) Appl. No.: 17/849,375

(22) Filed: Jun. 24, 2022

(65) Prior Publication Data
US 2022/0416529 A1 Dec. 29, 2022

(30) Foreign Application Priority Data

Jun. 25, 2021 (DE) ...................... 10 2021 116 420.6

(51) Int. Cl.
H02G 15/24 (2006.01)
H01R 4/18 (2006.01)
H01R 4/70 (2006.01)

(52) U.S. Cl.
CPC ............... *H02G 15/24* (2013.01); *H01R 4/70* (2013.01); *H01R 4/18* (2013.01)

(58) Field of Classification Search
CPC ...... F01N 3/027; F01N 3/2013; F01N 3/2026; F01N 13/1827; F01N 13/1844; F01N 2240/16; F01N 2450/20; F01N 2450/22; F01N 5/02; H01R 4/18; H01R 4/70; H01R 13/02; H01R 13/40; H01R 13/5205; H01R 13/5216; H01R 13/648; H02G 15/24; H05B 3/04; H05B 3/08; H05B 2203/022; Y02T 10/12; Y02T 10/40; Y02A 50/20
See application file for complete search history.

(56) References Cited

U.S. PATENT DOCUMENTS

| 6,031,213 A * | 2/2000 | Hashimoto ........... F01N 3/2026 422/174 |
| 6,109,946 A | 8/2000 | Hotz et al. |
| 6,176,081 B1 * | 1/2001 | Shimasaki ........... F01N 3/2026 422/174 |

(Continued)

FOREIGN PATENT DOCUMENTS

| DE | 10 2018 222 467 A1 | 6/2020 |
| EP | 0 716 558 A2 | 6/1996 |

(Continued)

*Primary Examiner* — Dapinder Singh
(74) *Attorney, Agent, or Firm* — Walter Ottesen, P.A.

(57) ABSTRACT

A connecting arrangement electrically connects a heating conductor to an electrical connection line. The heating conductor includes a heating conduction element having an exposed end segment defining a first connecting region and the electrical connection line includes a connection line conductor having an exposed end segment defining a second connecting region. A connector mutually electrically connects the exposed end segments. A shielding sleeve surrounds the first connecting region, the second connecting region and the connector. The shielding sleeve has first and second sleeve end portions and the shielding sleeve is connected to the heating conductor in the first connecting region and is connected to the electrical connection line in the second connecting region and so shields the exposed end segment of the heating conduction element and the exposed end segment of the connection line conductor and the connector against external influences.

12 Claims, 2 Drawing Sheets

(56) References Cited

U.S. PATENT DOCUMENTS

| | | | | |
|---|---|---|---|---|
| 9,225,107 | B2 * | 12/2015 | Hirth | H05B 3/42 |
| 9,393,521 | B2 * | 7/2016 | Brueck | F01N 3/2026 |
| 10,941,688 | B2 * | 3/2021 | Hirth | H01R 11/11 |
| 11,486,286 | B2 * | 11/2022 | Kurpejovic | F01N 3/027 |
| 11,566,557 | B2 * | 1/2023 | Uysal | F01N 13/1827 |

FOREIGN PATENT DOCUMENTS

| | | |
|---|---|---|
| EP | 0 739 152 A1 | 10/1996 |
| WO | 98/01653 A1 | 1/1998 |

* cited by examiner

CONNECTING ARRANGEMENT

CROSS REFERENCE TO RELATED APPLICATION

This application claims priority of German patent application no. 10 2021 116 420.6, filed Jun. 25, 2021, the entire content of which is incorporated herein by reference.

TECHNICAL FIELD

The present disclosure relates to a connecting arrangement for electrically connecting a heating conductor element to an electrical connection line, which connecting arrangement can be used in a particularly advantageous manner in order to connect an exhaust gas heater in an exhaust gas system of an internal combustion engine to connection lines leading to a voltage source in a vehicle.

BACKGROUND

Exhaust gas heaters are used in exhaust gas systems of internal combustion engines provided in motor vehicles in order to transfer heat, in particular in a start phase of operation of an internal combustion engine with still comparatively low exhaust gas temperatures and low temperatures of the exhaust gas-carrying components and in particular also of exhaust gas treatment arrangements, such as catalytic converters or particle filters for example, to the exhaust gas flowing around the components and arrangements and therefore bring system regions situated further downstream in the exhaust gas flow, such as the exhaust gas treatment arrangements for example, to an operating temperature more quickly. Exhaust gas heaters of this kind are generally electrically operated, and therefore it is necessary to electrically connect the exhaust gas heaters to the voltage sources provided in vehicles via connection lines.

The region of connection between a heating conductor element of an exhaust gas heater of this kind and the connection line or lines to be connected to the heating conductor element is subject to external influences in a vehicle, the external influences placing a heavy burden on the region. Firstly, media, such as for example salt water, the urea/water solution used for example as reducing agent in an SCR catalytic converter arrangement, engine oil and the like, can lead to corrosion, to electrical shorts or malfunctions, in particular when liquids of this kind enter the region of an open end of a connection line and so can migrate as far as a controller. Secondly, this connecting region is subject to heavy thermal loading on account of the very high temperatures of exhaust gas-carrying components of an exhaust gas system during operation, and is also subject to heavy mechanical loading on account of the shocks and vibrations occurring in a vehicle.

SUMMARY

An object of the present disclosure is to provide a connecting arrangement for electrically connecting a heating conductor element, in particular of an exhaust gas heater in an exhaust gas system of an internal combustion engine, to an electrical connection line, which connecting arrangement provides reliable protection for the region of the connection of a heating conductor element to a connection line with a structurally simple configuration.

According to the disclosure, this object is achieved by a connecting arrangement for electrically connecting a heating conductor element, in particular of an exhaust gas heater in an exhaust gas system of an internal combustion engine, having an electrical connection line, the heating conductor element having an exposed end portion of a heating conductor element conductor element in a heating conductor element connecting end region to be electrically connected to the connection line and the electrical connection line having an exposed end portion of a connection line conductor element in a connection line connecting end region to be electrically connected to the heating conductor element, including:

a connecting element electrically conductively connected to an exposed end portion of the heating conductor element conductor element and an exposed end portion of the connection line conductor element, a shielding sleeve surrounding the connection line connecting end region, the heating conductor element connecting end region and the connecting element connecting the exposed end portion of the heating conductor element conductor element to the exposed end portion of the connection line conductor element, the shielding sleeve being connected to the heating conductor element in the heating conductor element connecting end region in a first sleeve end portion and being connected to the connection line in the connection line connecting end region in a second sleeve end portion and shielding the exposed end portion of the heating conductor element conductor element, the exposed end portion of the connection line conductor element and the connecting element connecting the exposed end portion of the heating conductor element conductor element to the exposed end portion of the connection line conductor element against external influences.

In a connecting arrangement constructed according to the disclosure, it is possible, by way of separating the functions for establishing an electrically conductive connection on the one hand and for shielding this region against external influences, such as for example the effect of liquids, the thermal loading and the mechanical loading as well as the provision of reliable electrical insulation, on the other hand, to provide an optimized configuration for each of these two functions independently of the other function. The connecting element implements the electrically conductive connection which is shielded by the shielding sleeve against external influences and in particular is also electrically insulated to the outside. The risk of liquid entering this connecting region and potentially leading to damage or to operational faults is likewise precluded, as is the risk of the thermal or/and mechanical loads occurring in a vehicle potentially leading to damage to the connection or to a line interruption.

It should be noted that, within the meaning of the present disclosure, an exposed end portion of a fundamentally electrically conductive element, such as for example the heating conductor element conductor element or the connection line conductor element, is an electrically non-insulated end portion and therefore one that is exposed for providing an electrical connection to another component.

For the purpose of providing a robust connection to the connecting element, the heating conductor element conductor element can be provided, at least in its exposed end portion, as a solid conductor body, for example wire.

In order to configure the connection line in a flexible manner, it is proposed that the connection line conductor element is provided with a plurality of individual wires at least in its exposed end portion.

For the purpose of electrical connection to the heating conductor element or the connection line, the connecting element can have a heating conductor element receiving opening receiving the exposed end portion of the heating conductor element conductor element or/and a connection line receiving opening receiving the exposed end portion of the connection line conductor element.

For a configuration which is robust but nevertheless implements a reliable electrical connection, the exposed end portion of the connection line conductor element can be fixedly held in the connection line receiving opening by non-positive locking or/and positive locking produced by deforming the connecting element in the region of the connection line receiving opening. As an alternative or in addition, the exposed end portion of the connection line conductor element can be fixedly held in the connection line receiving opening by material cohesion, preferably soldering.

The robust and reliable electrical connection can further be aided by the exposed end portion of the heating conductor element conductor element being fixedly held in the heating conductor element receiving opening by non-positive locking produced by pressing the exposed end portion of the heating conductor element conductor element into the heating conductor element receiving opening or/and by non-positive locking or/and positive locking produced by deforming the connecting element in the region of the heating conductor element receiving opening, or/and by the exposed end portion of the heating conductor element conductor element being fixedly held in the heating conductor element receiving opening by material cohesion, preferably soldering.

In order to make it easier to press the exposed end portion of the heating conductor element conductor element into the connecting element, the connecting element can be of slotted configuration at least in the region of the heating conductor element receiving opening.

For defined positioning of the conductor elements to be electrically connected to one another in the connecting element, it is proposed that the connecting element is of tubular configuration and has two conductor element receiving portions separated from one another by a push-in stop formed preferably by deforming the connecting element, one of the conductor element receiving portions providing the heating conductor element receiving opening and the other of the conductor element receiving portions providing the connection line receiving opening.

For a tight and also mechanically robust connection of the shielding sleeve to the heating conductor element, the shielding sleeve can be connected to a sheath of the heating conductor element, the sheath surrounding the heating conductor element in the heating conductor element connecting end region, by material cohesion, preferably soldering or/and welding, in the first sleeve end portion.

For a mechanically robust connection, which is also tight to the ingress of liquids or contaminants, to a connection line of generally flexible configuration, at least one sealing element surrounding the connection line and being surrounded by the shielding sleeve can be provided in the second sleeve end portion of the shielding sleeve.

When a sealing element of this kind is used, it is proposed that the at least one sealing element is held in a manner pressed between the shielding sleeve and the connection line by deforming the shielding sleeve in the second sleeve end portion, or/and that the at least one sealing element is of annular configuration, or/and that the at least one sealing element is constructed using elastic material, preferably rubber material.

The disclosure further relates to an exhaust gas heating arrangement for an exhaust gas system of an internal combustion engine, including a heating conductor element around which exhaust gas flowing in an exhaust gas guide volume flows, the heating conductor element being guided through a wall bounding the exhaust gas guide volume in the region of at least one bushing and being connected to a connection line outside the exhaust gas guide volume via a connecting arrangement constructed according to the disclosure in at least one heating conductor element connecting end region, preferably in two heating conductor element connecting end regions.

The disclosure further relates to an exhaust gas system for an internal combustion engine, for example in a vehicle, having an exhaust gas heating arrangement constructed according to the disclosure.

BRIEF DESCRIPTION OF THE DRAWINGS

The invention will now be described with reference to the drawings wherein.

DESCRIPTION OF THE PREFERRED EMBODIMENTS

Figure 1:
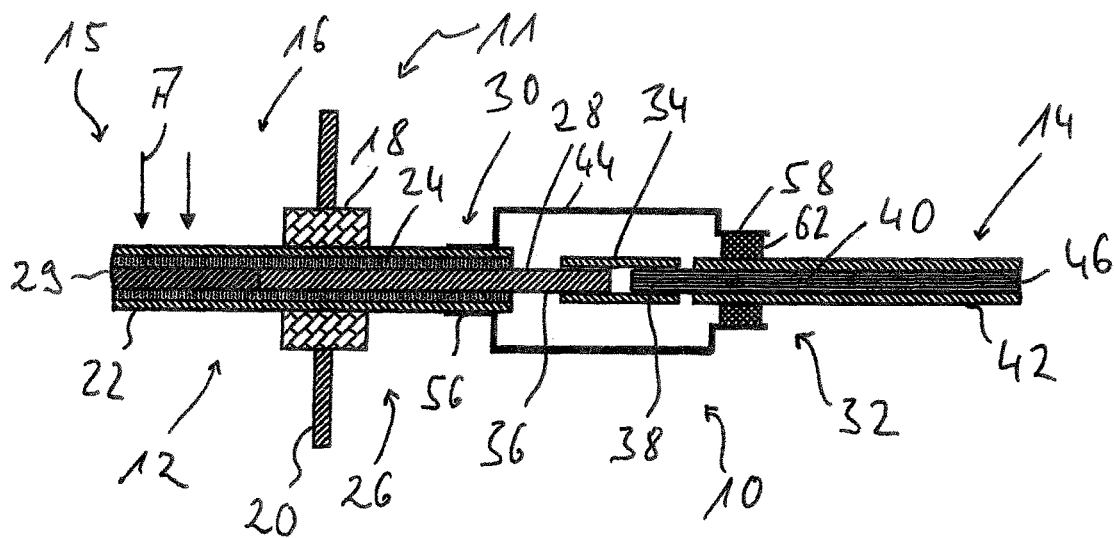
FIG. 1 is a schematic of a connecting arrangement for electrically connecting a heating conductor element to a connection line in an exhaust gas system of an internal combustion engine.

FIG. 1 is a schematic of a connecting arrangement 10 which, in an exhaust gas system, designated 11 in general, of an internal combustion engine serves to establish an electrically conductive and mechanically robust connection between a heating conductor element 12 and a connection line 14 connecting the heating conductor element 12 to a voltage source, for example a battery or an on-board electrical system in a vehicle.

The heating conductor element 12 is an important constituent part of an exhaust gas heater 15 arranged in an exhaust gas flow volume 16, through which exhaust gas A flows, and by way of which heat can be transferred, as required, to the exhaust gas A flowing around it.

The heating conductor element 12 illustrated merely by way of example in FIG. 1 is guided through a wall 20, bounding the exhaust gas flow volume 16, of an exhaust gas guide component, for example an exhaust gas pipe or the like, in the region of a bushing 18. The heating conductor element 12 has, at least in the region guided through the wall 20 via the bushing 18, a sheath 22 constructed for example from stainless steel or some other metal material. A heating conductor element conductor element 28 of the heating conductor element 12, which heating conductor element conductor element can advantageously be in the form of a single solid conductor body, for example wire, is provided in the interior of the sheath 22 with the interposition of electrically insulating material 24, such as for example compressed ceramic powder or the like, in the region of the heating conductor element 12 guided through the wall and also designated cold end 26 in general. In the interior of the exhaust gas guide component or in the exhaust gas flow volume 16, the heating conductor 29 of the heating conductor element 12, which heating conductor heats up when an electrical voltage is applied and in the process electric current flows, adjoins the heating conductor element conductor element 28. The heating conductor 29, in its overall length region extending in the exhaust gas flow volume 16, can be surrounded by the electrically insulating material 24 or the sheath 22. In an alternative embodiment, the heating conductor 29 could be exposed in its main region of extent in the exhaust gas flow volume 16, that is, may not be surrounded by the sheath 22 and may not be surrounded by the insulating material 24, in order to thereby improve the thermal interaction with the exhaust gas A. The sheath 22 or the electrically insulating material 24 could therefore be limited to the length region of the heating conductor element 12 in which the heating conductor element is guided through the wall 20 by way of its cold end 26.

In its heating conductor element connecting region 30 situated outside the exhaust gas flow volume 16, the heating conductor element 12 is electrically conductively and mechanically connected to a connection line connecting region 32 of the connection line 14 by the connecting arrangement 10. The electrically conductive connection is implemented by a, for example, tubular or sleeve-like connecting element 34 which connects an exposed, that is, not electrically insulated, end portion 36 of the heating conductor element conductor element 28 to an exposed, that is, therefore likewise not electrically insulated, end portion 38 of a connection line conductor element 40.

Even though a certain mechanical connection is provided between the heating conductor element 12 and the connection line 14 via the connecting element 34, the mechanical connection between the heating conductor element 12 and the connection line 14, which mechanical connection absorbs the majority of the loads during operation, is provided by a shielding sleeve 44 fixedly connected in the manner described below both to the sheath 22 of the heating conductor element 12 and also a sheath 42 of the connection line 14. This shielding sleeve 44 provides not only a robust mechanical connection between the heating conductor element 12 and the connection line 14, but rather also provides, for the region in which the electrically conductive connection is implemented in the region of the heating conductor element connecting end region 30 and the connection line connecting end region 32, shielding of the electrically conductive connection or of the system regions provided therefor. The shielding sleeve prevents liquids, such as for example water or salt water, a urea/water solution, engine oil or the like, from entering the region of the exposed end regions 36, 38, and also prevents contaminants from being able to reach this region. There is therefore no way for water to enter the connection line 14 in the region of the open end of the connection line and migrate through the connection line 14 as far as a controller and lead to damage or malfunctions there. At the same time, the shielding sleeve 44 constitutes electrical insulation to the outside, and therefore also prevents shorts from being produced. Furthermore, the region of the electrical connection is thermally shielded, in particular also by the thermal shielding provided by the heating conductor element conductor element 28 providing the cold end 26. This can be attributed to the heating conductor element conductor element 28 guided through the wall 20 itself being only slightly heated up when an electrical voltage is applied and electric current flows through the heating conductor element 12.

Figure 2:
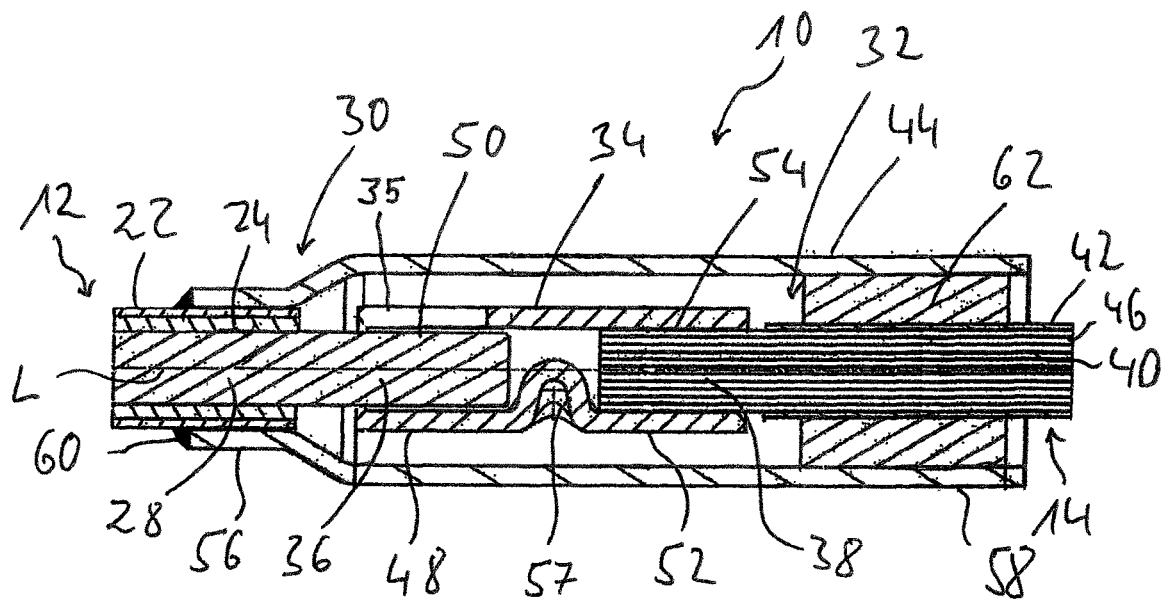
FIG. 2 shows a longitudinal section view of an embodiment of the connecting arrangement shown in FIG. 1; and, FIG. 3 is a schematic, corresponding to FIG. 2, of an alternative embodiment of a connecting arrangement.

FIG. 2 shows an embodiment of a connecting arrangement 10 of this kind in detail. The exposed end regions 36, 38 of the heating conductor element conductor element 28 and of the connection line conductor element 40 can be seen in FIG. 2. Since the connection line 14 is generally of flexible configuration in order to be able to be guided through a vehicle in a suitable manner, the connection line conductor element 40 is preferably formed with a large number of individual cores or wire strands 46.

The connecting element 34 is constructed from electrically highly conductive metal material and has a fundamentally tubular structure. The connecting element 34 provides, in a conductor element receiving portion 48 illustrated on the left-hand side in FIG. 2, a heating conductor element receiving opening 50 extending substantially beyond the entire conductor element receiving portion 48, and provides, in a conductor element receiving portion 52 shown on the right-hand side in FIG. 2, a connection line receiving opening 54 which extends substantially over the entire length of the conductor element receiving portion. In a region which is in the center in the longitudinal direction of the connecting element 34, a push-in stop 57, which specifies the maximum penetration depth of the heating conductor element conductor element 28 or the connection line conductor element 40, is formed, for example, by a recessed formation.

In order to establish the electrical connection by the connecting element 34, the connecting element, by way of its conductor element receiving portion 48, can be pushed over the exposed end portion 36 of the heating conductor element conductor element 28. In this case, provision may be made, for example, for the heating conductor element conductor element 28 to be pressed into the heating conductor element receiving opening 50 in order to achieve good electrical contact. In order to be able to compensate for manufacturing tolerances, the connecting element 34 can be of slotted configuration at least in its conductor element receiving portion 48. For example, in the conductor element receiving portion 48, the connecting element 34 can be formed with a slot 35 which extends in the longitudinal direction of the conductor element receiving portion and is open to its free end.

If the heating conductor element conductor element 28, by way of its end portion 36, is pressed into the connecting element 34, reliable electrical contact-connection between the heating conductor element conductor element 28 and the connecting element 34 can be implemented solely on account of the positive locking produced as a result. As an alternative or in addition to pressing the heating conductor element conductor element 28 into the connecting element 34, reliable electrical contact-connection can also be achieved by way of the heating conductor element conductor element 28, after it has been inserted, possibly pressed, into the connecting element 34, being compressed in the region of the conductor element receiving portion 48, for example in a crimping process, so that reliable electrical contact between the heating conductor element conductor element 28 and the connecting element 34 is produced during this deformation of the connecting element 34 by non-positive locking and given correspondingly severe deformation by positive locking too.

As an alternative or in addition, the electrical contact between the heating conductor element conductor element 28 and the connecting element 34 can also be reliably configured by way of these two components being connected to one another by material cohesion, in particular by soldering. For this purpose, the heating conductor element conductor element can be surrounded by soldering material in its exposed end portion 36 which is to be received in the heating conductor element receiving opening 50. Following this, the end portion 36 is inserted, for example pressed, into the conductor element receiving portion 48. The soldering material is then melted and therefore the soldered connection, which also establishes a mechanical connection between the connecting element 34 and the end portion 36, is produced.

The reliable electrical connection between the connecting element 34 and the end portion 38 of the connection line conductor element 40 can also be achieved by material cohesion or/and positive locking or/and non-positive locking. For the purpose of providing material cohesion, soldering material can be applied to the end portion 38 in the end portion 38, for example after the cores or wires 46 protruding there from the sheath 42 have been compacted. The end portion 38 can then be inserted into the conductor element receiving portion 52, until it meets the push-in stop 57. The soldering material can be melted by heating and the electrically conductive connection can be produced in this way.

As an alternative or in addition to this electrically conductive connection, after the end portion 38 that may be surrounded by soldering material has been inserted, the connecting element 34 can be compressed in its conductor element receiving portion 52, for example in a crimping process, so that firstly non-positive locking and secondly also positive locking between the connecting element 34 and the end portion 38 of the connection line conductor element 40 is produced by the compression.

After the two conductor elements 28, 40 have been electrically conductively connected to one another by the connecting element 34, the shielding sleeve 44 is pushed over this region of the connection of the heating conductor element 12 to the connection line 14. For this purpose, the shielding sleeve 44 can be pushed over the connection line 14, for example even before the connection line 14 is connected to the connecting element 34, so that the shielding sleeve 44, by being pushed along the connection line 14, can then be positioned such that a first sleeve end portion 56 surrounds the heating conductor element 12 or the sheath 22 in the heating conductor element connecting region 30 and a second sleeve end portion 58 surrounds the connection line 14 or the sheath 42 in the connection line connecting region 32.

The shielding sleeve 44, which is preferably constructed using metal material, is then connected to the heating conductor element 12 of the sheath 22 by material cohesion. For this purpose, the sheath 22 can be coated with soldering material in its length region over which the first sleeve end portion 56 subsequently engages, for example before the shielding sleeve 44 is arranged with the positioning illustrated in FIG. 2. After the shielding sleeve 44, by way of its first sleeve end portion 56, has been pushed onto the region of the sheath 22 preferably completely coated with soldering material in the circumferential direction, this soldering material can be melted by heating and therefore a mechanically robust connection which prevents the ingress of contaminants or liquids can be established between the heating conductor element 12 and the shielding sleeve 44.

In an alternative materially cohesive connection or, if required, one that is to be provided in addition, a weld seam 60 preferably running all the way around the sheath 22 can be formed by laser welding for example, this weld seam joining the first sleeve end portion 56 in the region of an end side of the same to the outer circumferential surface of the sheath 22.

In the second sleeve end portion 58, an annular, elastically deformable sealing element 62 which is constructed with rubber material or rubber-like material for example is positioned between the second sleeve end portion and the connection line connecting region 32 or the sheath 42 of the connection line 14. The sealing element can also already be pushed onto the connection line 14 before the electrical connection with the connection line has been established, so that it subsequently only has to be pushed along the sheath 42 in order to be able to be arranged with the positioning illustrated in FIG. 2 in which it surrounds the outside of the connection line 14 in the connection line connecting region 32 and is surrounded on its outer side by the second sleeve end portion 58 of the shielding sleeve 44. After this, the sealing element 62 can be radially compressed by deforming the shielding sleeve 44 in the second sleeve end portion 58 radially inward, radially with respect to a longitudinal center axis L of the shielding sleeve 44. In this case, the sealing element 62, by way of being supported on the second sleeve end portion 58 radially to the outside, is pressed strongly radially to the inside against the outer circumferential surface of the sheath 42 in such a way that the shielding sleeve 44 and the connection line 14 are held together firstly in a manner tight to the ingress of contaminants and liquids and secondly in a mechanically robust manner.

In the manner described above, the heating conductor element 12 can be connected to the connection line 14 in a mechanically robust and reliably electrically conductive manner after the exhaust gas heater 15 has been integrated into the exhaust gas flow volume 16 and the heating conductor element 12 has been guided through the wall 20. In this case, the dimensioning of the connecting arrangement 10 can be matched firstly to the structural conditions in a vehicle and secondly to the electric currents to be carried, so that use even in high-voltage applications is possible in particular. Since the electrically conductive or current-carrying components are shielded to the outside by the shielding sleeve 44 in their regions that are connected to one another, a high degree of safety is also ensured. The shielding sleeve 44 is joined to the heating conductor element 12 on the one hand and the connection line 14 on the other, in each case in such a way that a very robust and reliable connection is produced, taking into account the construction materials respectively used. In the region of the heating conductor element 12, this connection can be realized by material cohesion since both the sheath 22 and also the shielding sleeve 44 are preferably constructed using metal material. In the region of the connection line 14, the sheath 42 of the connection line generally being constructed from plastic material and being flexible just like the cores or wires 46 running in the interior of the sheath 42, a termination which is permanently tight to the ingress of contaminants and liquids and in particular is also air-tight, and at the same time allows component tolerances or thermal expansions to be compensated for, is achieved owing to the use of the elastically deformable sealing element 62 which is pressed against the sheath 42. Since a robust mechanical connection between the heating conductor element 12 and the connection line 14 is already ensured by the shielding sleeve 44, the electrical connection provided by the connecting element 34 can be optimized in respect of electrical conduction, although it can also support a certain mechanical load.

It should further be noted that, for the purpose of connection to the two electrical poles of a voltage source or a voltage supply system, the heating conductor element 12, in its two end regions, can be connected to a respective connection line 14 in the manner described above and illustrated in the figures.

Figure 3:
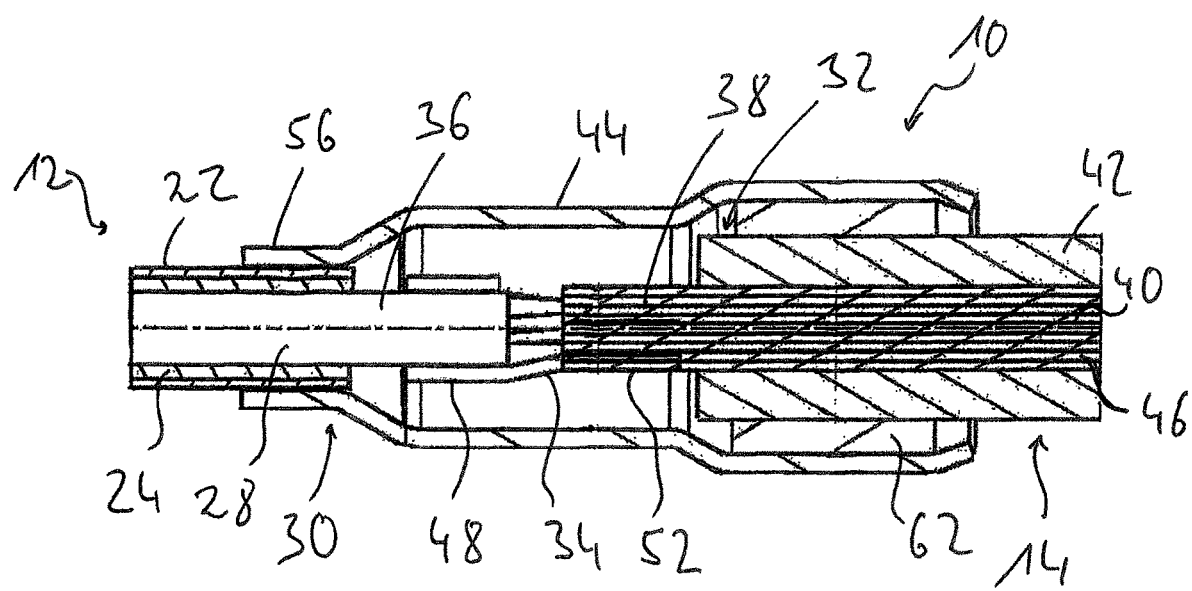

An alternative embodiment of a connecting arrangement 10 of this kind is illustrated in FIG. 3. This corresponds in respect of essential aspects to the embodiment described above with reference to FIG. 2, and therefore only the differences from the embodiment of FIG. 2 will be discussed below. These differences can be found, in particular, in the configuration of the connecting element 34. The connecting element, in its conductor element receiving portion 48 to be connected to the heating conductor element conductor element 28, is shaped such that it engages around the end portion 36 only over part of its circumference. The region of the connecting element 34, provided for example as a deformed sheet-metal part, engaging partially around the end portion 36 therefore provides the heating conductor element receiving opening 50 formed in the conductor element receiving portion 48 which, in this embodiment, is open in a circumferential region of the conductor element receiving portion 48. For example, the conductor element receiving portion 48 can engage around the end portion 36 in the region of approximately 50 to 75% of its circumference. The end portion 36 can be fixed to the conductor element receiving portion 48 or to the connecting element 34, as described above with reference to FIG. 2, by material cohesion or/and positive locking or/and non-positive locking.

In the region of its conductor element receiving portion 52, the connecting element 34 illustrated in FIG. 3 can be shaped such that it, by way of a substantially M-shaped or W-shaped circumferential contour, engages around the end portion 38 of the connection line conductor element 40 in opposite circumferential directions and in this way provides the connection line receiving opening 54 in the conductor element receiving portion 52. By way of pinching together the M-shaped or W-shaped structure, the connecting element 34, in its region receiving the end portion 38, that is, in the region of the connection line receiving opening 54, can be pressed against the end portion 38 or the cores or wires 46 providing the end portion. In so doing, they are held together substantially by non-positive locking, but can also be aided by material cohesion which can be produced by surrounding the end portion 38 with soldering material beforehand and melting the soldering material after the connecting element 34 has been deformed.

It is understood that the foregoing description is that of the preferred embodiments of the invention and that various changes and modifications may be made thereto without departing from the spirit and scope of the invention as defined in the appended claims.

What is claimed is:

1. An exhaust gas heating arrangement for an exhaust gas system of an internal combustion engine, the exhaust gas system including a guide for conducting a flow of exhaust gas therethrough and said guide defining a wall bounding the flow of the exhaust gas, the exhaust gas heating arrangement comprising:
   a heating conductor element arranged in said flow of exhaust gas in said guide;
   at least one bushing arrangement in said wall;
   said heating conductor element being guided through said wall in the region of said bushing;
   an electrical connection line disposed outside of said guide;
   a connecting arrangement for connecting said heating conductor element to said electrical connection line externally of said guide;
   said connecting arrangement including:
   said heating conductor element including a heating conductor element conductor element having an exposed end segment defining a first connecting region;
   said electrical connection line including a connection line conductor having an exposed end segment defining a second connecting region;
   a connector electrically connected to said exposed end segment of said heating conductor element conductor element and electrically connected to said exposed end segment of said connection line conductor so as to connect said exposed end segments to each other;
   a shielding sleeve surrounding said first connecting region, said second connecting region and said connector;
   said shielding sleeve having first and second sleeve end portions; and,
   said shielding sleeve being connected to said heating conductor element in said first connecting region in said first sleeve end portion and being connected to said electrical connection line in said second connecting region in said second sleeve end portion and so shielding said exposed end segment of said heating conductor element conductor element and said exposed end segment of said connection line conductor and said connector against external influences,
   wherein said heating conductor element further includes a sheath made of metal material and surrounding said heating conductor element conductor element in said first connecting region with the interposition of electrically insulating material,
   wherein said shielding sleeve is connected to said sheath in said first sleeve end portion by material cohesion.

2. The exhaust gas heating arrangement of claim 1, wherein at least one of the following applies:
   a) said heating conductor element conductor element is configured as a solid conductor body at least with respect to said exposed end segment thereof; and,
   b) said connection line conductor is configured as a plurality of wire strands at least with respect to said exposed end segment thereof.

3. The exhaust gas heating arrangement of claim 1, wherein said connector is configured so as to cause at least one of the following to apply:
   a) said connector has a first opening for receiving said exposed end segment of said heating conductor element conductor element therein; and,
   b) said connector has a second opening for receiving said exposed end segment of said connection line conductor therein.

4. The exhaust gas heating arrangement of claim 3, wherein said exposed end segment of said connection line conductor is fixedly held in said second opening of said connector via at least one of the following:
   a) non-positive locking;
   b) positive locking produced by deformation of said connector in the region of said second opening thereof; and,
   c) material cohesion.

5. The exhaust gas heating arrangement of claim 4, wherein said exposed end segment of said heating conductor element conductor element is fixedly held in said first opening of said connector via at least one of the following:
   a) non-positive locking produced by pressing said exposed end segment of said heating conduction element into said first opening;
   b) non-positive locking;

c) positive locking produced by deformation of said connector in the region of said first opening thereof; and,
d) material cohesion.

6. The exhaust gas heating arrangement of claim 3, wherein said connector is a slotted connector at least in the region of said first opening.

7. The exhaust gas heating arrangement of claim 3, wherein said connector is configured to be tubular and has first and second receiving portions for receiving corresponding ones of said exposed end segments of said heating conductor element conductor element and said conduction line conductor, respectively; said connector further includes a push-in stop mutually separating said first and second receiving portions; and, said first and second receiving portions define corresponding ones of said first and second openings.

8. The exhaust gas heating arrangement of claim 7, wherein said push-in stop is defined by a deformation of said connector.

9. The exhaust gas heating arrangement of claim 1, wherein said shielding sleeve is connected to said sheath in said first sleeve end portion by
soldering or welding.

10. The exhaust gas heating arrangement of claim 1, further comprising at least one sealing element surrounding said electrical connection line and said at least one sealing element being surrounded by said shielding sleeve in said second sleeve end portion thereof.

11. The exhaust gas heating arrangement of claim 10, wherein at least one of the following:
a) said at least one sealing element is held pressed between said shielding sleeve and said electrical connection line by
deformation of said shielding sleeve in said second sleeve end portion;
b) said at least one sealing element is of annular configuration;
c) said at least one sealing element is configured of elastic material; and,
d) said at least one sealing element is configured of rubber material.

12. An exhaust gas system for an internal combustion engine, the exhaust gas system comprising:
a guide for conducting a flow of exhaust gas therethrough and said guide defining a wall bounding the flow of the exhaust gas;
a heating arrangement;
a heating conductor element arranged in said flow of exhaust gas in said guide;
at least one bushing arrangement in said wall;
said heating conductor element being guided through said wall in the region of said bushing;
an electrical connection line disposed outside of said guide;
a connecting arrangement for connecting said heating conductor element to said electrical connection line externally of said guide;
said connecting arrangement including:
said heating conductor element including a heating conductor element conductor element having an exposed end segment defining a first connecting region;
said electrical connection line including a connection line conductor having an exposed end segment defining a second connecting region;
a connector electrically connected to said exposed end segment of said heating conductor element conductor element and electrically connected to said exposed end segment of said connection line conductor so as to connect said exposed end segments to each other;
a shielding sleeve surrounding said first connecting region, said second connecting region and said connector;
said shielding sleeve having first and second sleeve end portions; and,
said shielding sleeve being connected to said heating conductor element in said first connecting region in said first sleeve end portion and being connected to said electrical connection line in said second connecting region in said second sleeve end portion and so shielding said exposed end segment of said heating conductor element conductor element and said exposed end segment of said connection line conductor and said connector against external influences,
wherein said heating conductor element further includes a sheath made of metal material and surrounding said heating conductor element conductor element in said first connecting region with the interposition of electrically insulating material,
wherein said shielding sleeve is connected to said sheath in said first sleeve end portion by material cohesion.

* * * * *